United States Patent [19]

Gibbons et al.

[11] Patent Number: 5,289,576
[45] Date of Patent: Feb. 22, 1994

[54] ATTRIBUTE FILTER FOR COMPUTER GRAPHICS APPLICATIONS

[75] Inventors: Daniel G. Gibbons, Ulster Park, N.Y.; James A. Harstad, Dover, Mass.; David C. Tannenbaum, Hurley, N.Y.

[73] Assignee: International Business Machines Corporation, Armonk, N.Y.

[21] Appl. No.: 849,920

[22] Filed: Mar. 12, 1992

[51] Int. Cl.$^5$ .............................................. G06F 15/20
[52] U.S. Cl. ................................. 395/162; 395/160
[58] Field of Search ............... 395/155, 159, 160–162, 395/164, 166; 340/721, 729, 798–800

[56] References Cited

U.S. PATENT DOCUMENTS

| | | | |
|---|---|---|---|
| 4,601,021 | 7/1986 | Paul et al. | 395/600 |
| 4,870,599 | 9/1989 | Hempel et al. | 395/155 |
| 5,182,797 | 1/1993 | Liang et al. | 395/160 |

OTHER PUBLICATIONS

"The graPHIGS Programming Interface: Understanding Concepts", pp. 6–9 to 6–10. Mar. 1988.

*Primary Examiner*—Dale M. Shaw
*Assistant Examiner*—Kee M. Tung
*Attorney, Agent, or Firm*—Mark S. Walker; William A. Kinnaman, Jr.

[57] ABSTRACT

A hardware filter for controlling the detectability, highlighting and invisibility of graphics primitives. Each of the three display attributes (detectability, highlighting, and invisibility) being controlled has associated with it both an inclusion counter and an exclusion counter, for a total of six counters. Associated with each class name is a flag, indicating whether the class name is a member of the currently active set, as well as a 6-bit string indicating the effect of the class on each of the six filters. On traversal of the structure hierarchy, upon encountering an order for the addition of a class name to the set, and if the flag corresponding to the class name has not already been set, the flag is set and the corresponding filter counters are incremented in parallel by gating an incrementing signal with the 6-bit string. Similarly, upon encountering an order for the removal of a class name to the set, and the flag corresponding to the class name has not been reset, the flag is reset and the corresponding filter counters are decremented by gating a decrementing signal with the 6-bit string. Subsequently encountered primitives are considered as detectable, highlighted or invisible if the corresponding inclusion filter counter is greater than zero, indicating that the primitive belongs to at least one included class, and the corresponding exclusion filter counter is zero, indicating that the primitive does not belong to any excluded class.

6 Claims, 5 Drawing Sheets

ATTRIBUTE FILTER FOR COMPUTER GRAPHICS APPLICATIONS

BACKGROUND OF THE INVENTION

1. Field of the Invention

This invention relates to an attribute filter for computer graphics applications and, more particularly, to a method and apparatus for filtering PHIGS attributes such as detectability, highlighting and invisibility.

2. Description of the Related Art

Programmer's Hierarchical Interactive Graphics System (PHIGS) is an applications programming interface (API) widely used in computer graphics applications. PHIGS primitives have various attributes, including the attributes of detectability (or pickability), highlighting, and visibility. Highlighting indicates whether the images of subsequent output primitives encountered during structure traversal are to be distinguished in a workstation-dependent manner. Visibility indicates whether output primitives are rasterized for display. Detectability (or pickability) indicates whether a primitive is eligible for a user selection operation known as picking.

Graphics applications written to the PHIGS standard use the filter operations to control detectability, highlighting and invisibility of such primitives as lines, surfaces, text and markers. A discussion of PHIGS filters may be found in the IBM publication *The graPHIGS TM Programming Interface: Understanding Concepts*, SC33-8102-2, pp. 6-9 to 6-10 (3d ed. 1988), as well as in Hempel et al. U.S. Pat. No. 4,870,599, entitled "Traversal Method for a Graphics Display System". (IBM and graPHIGS are trademarks of IBM Corporation.) Large applications may invoke filter operations with such frequency that the filter operation processing time becomes a major factor in the overall performance of a graphics processor.

SUMMARY OF THE INVENTION

In general, the present invention contemplates a hardware filter for controlling the detectability, highlighting and invisibility of graphics primitives. Each of the three display attributes (detectability, highlighting, and invisibility) being controlled has associated with it both an inclusion counter and an exclusion counter, for a total of six counters. Associated with each class name is a flag, indicating whether the class name is a member of the currently active set, as well as a 6-bit string indicating the effect of the class on each of the six filters.

On traversal of the structure hierarchy, upon encountering an order for the addition of a class name to the set, and if the flag corresponding to the class name has not already been set, the flag is set and the corresponding filter counters are incremented in parallel by gating an incrementing signal with the 6-bit string. Similarly, upon encountering an order for the removal of a class name to the set, and the flag corresponding to the class name has not been reset, the flag is reset and the corresponding filter counters are decremented by gating a decrementing signal with the 6-bit string. Subsequently encountered primitives are considered as detectable, highlighted or invisible if the corresponding inclusion filter counter is greater than zero, indicating that the primitive belongs to at least one included class, and the corresponding exclusion filter counter is zero, indicating that the primitive does not belong to any excluded class.

This invention is a hardware solution to the filtering task. The majority of the operations previously performed strictly in software have been incorporated into hardware. The result is a dramatic improvement in the overall performance of the filter operations with no loss of generality or function. Furthermore, this solution requires only modest resources, and thus is inexpensive to implement making it attractive to an entire product range.

DESCRIPTION OF THE PREFERRED EMBODIMENT

Regarding the various terms that are used in this specification, "graphics order" is a generic term for a command that is sent to a graphics processor, as described below. A "structure element" is a graphics order corresponding to a structure element of a PHIGS hierarchy, to be described below. A "primitive" is a structure element that is an actual entity to draw (e.g., polyline, polymarker, text, etc.), as distinguished from a non-primitive structure element that defines an attribute (e.g., polyline color, marker type, etc.)

Figure 1:
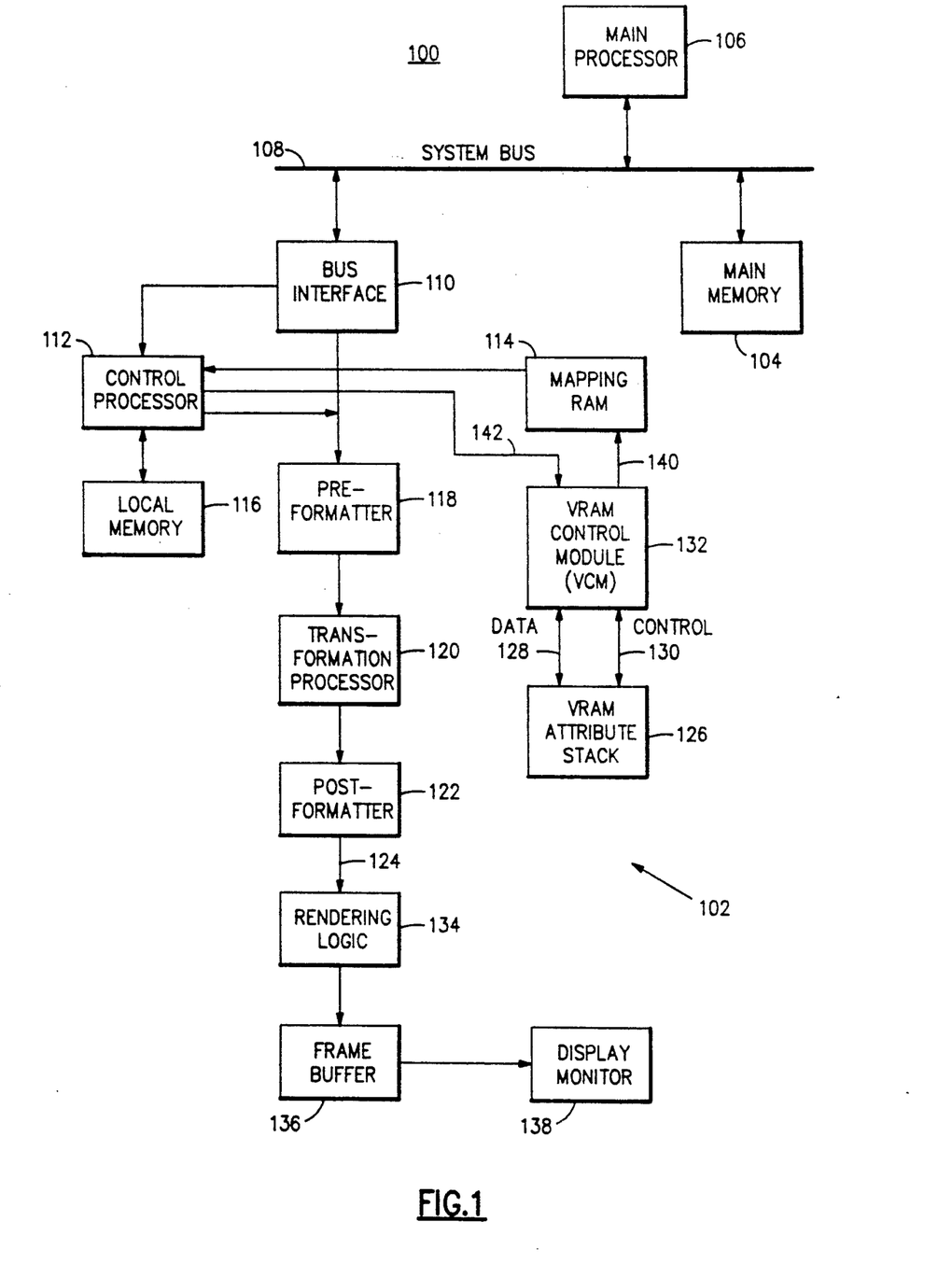
FIG. 1 is a schematic block diagram of a computer graphics system incorporating the present invention.

Referring to FIG. 1, a computer graphics system 100 incorporating the present invention includes a graphics subsystem 102 coupled to a main memory 104 and main processor 106 via a system bus 108. Main memory 104 and main processor 106 handle the general processing tasks of the system 100, not necessarily relating to the graphics subsystem 102. Main memory 104 stores graphics primitives that are converted by graphics subsystem 102 to an image for display by a raster scan device; these primitives are organized hierarchically, as described further below. Also coupled to system bus 108, but not shown in FIG. 1, are various peripheral input/output (I/O) devices such as secondary storage, a keyboard, and optionally other devices such as a mouse. System 100 may be any of a number of graphics systems such as the IBM 6095 graphics system or the IBM RISC System/6000 workstation. (RISC System/6000 is a trademark of IBM corporation).

Graphics subsystem 102 attaches to system bus 108 via a bus interface 110. A graphics control processor (GCP) 112 attached to bus 108 reads the primitives from main memory 104 and passes them via a preformatter 118 to a transformation processor 120 constituting a graphics pipeline. Control processor 112 also accesses a local memory 116, which may be a random access memory (RAM). A postformatter 122 at the bottom of the pipeline supplies the output of transformation processor 120 to rendering logic 134 via lines 124. Rendering logic 134 takes the transformed primitive, which is still in the form of endpoint coordinates, together with attribute information (line thickness, style, color, etc.), and rasterizes it by converting it to a pixel image formed by a pattern of pixel intensities representing the object. This pixel image is stored in a frame buffer 136 for periodic scanout to a display device 138 such as a cathode ray tube (CRT) monitor.

The filter logic of the present invention is contained in a VRAM control module (VCM) 132, which is coupled to a video RAM (VRAM) attribute stack 126 via data lines 128 and control lines 130. VRAM control module 132 contains the various filter counters to be described below, as well as the logic for controlling the indexing of these counters and for resolving the counter outputs. VRAM attribute stack 126 stores the class name flags indicating whether a particular class name is a member of the current set. VRAM control module 132 receives input lines 142 from control processor 112 and has output lines 140 connected to a mapping RAM 114 coupled to the control processor. Mapping RAM 114 functions in a conventional manner to convert op codes received from VRAM control module 132 to branch addresses in local memory 116 indicated by the op codes.

Figure 2:
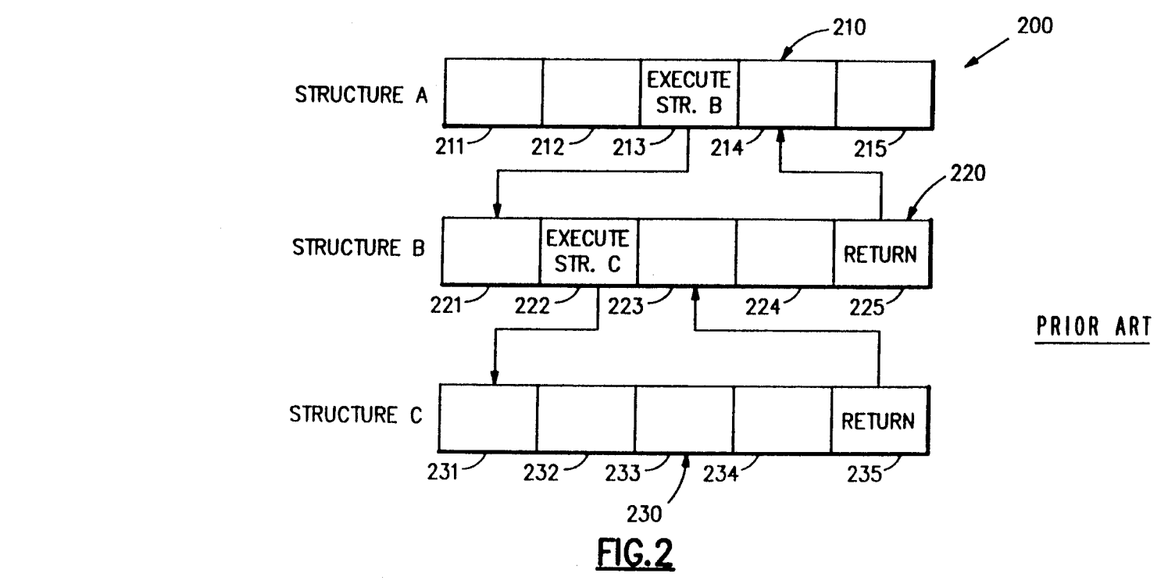
FIG. 2 is a schematic block diagram of a hierarchical data structure of the type processed by the system shown in FIG. 1.

FIG. 2 shows a typical hierarchical graphics data structure that may be handled by the system 100. As shown in the figure, a structure hierarchy 200 consists of a number of structures at different levels, in this particular example structure A (210), structure B (220) and structure C (230). Each structure in turn consists of structure elements. Thus, in the example shown in FIG. 2, structure A consists of structure elements 211-215, structure B consists of structure elements 221-225, and structure C consists of structure elements 231-235.

Structure hierarchy 200 is traversed by starting with structure element 211 of structure A (210), the uppermost structure of the hierarchy, and processing the structure elements in turn. These structure elements may include execute-structure commands, as at 213 and 222, which invoke lower structures, as well as conditional return-from-structure elements, as at 235 and 225, which return control to invoking structures. Thus, upon reaching structure element 213 (execute structure B), control passes from structure A (210) to structure B (220) and proceeds to the right along structure B as it did previously along structure A. Similarly, upon reaching structure element 222 (execute structure C), control passes from structure B (220) to structure C (230) and proceeds to the right along structure C as it did previously along structure B. Upon reaching structure element 235 (return to structure B), control passes from structure C (230) to structure B (220) and continues to the right along structure B until it reaches structure element 225 (return to structure A), at which point control returns to structure element 214 in structure A.

In addition to calling for the execution of lower-level structures or the return to higher-level structures, structure elements may also define graphics primitives or add or remove class names from the current (or active) set.

Figure 2A:
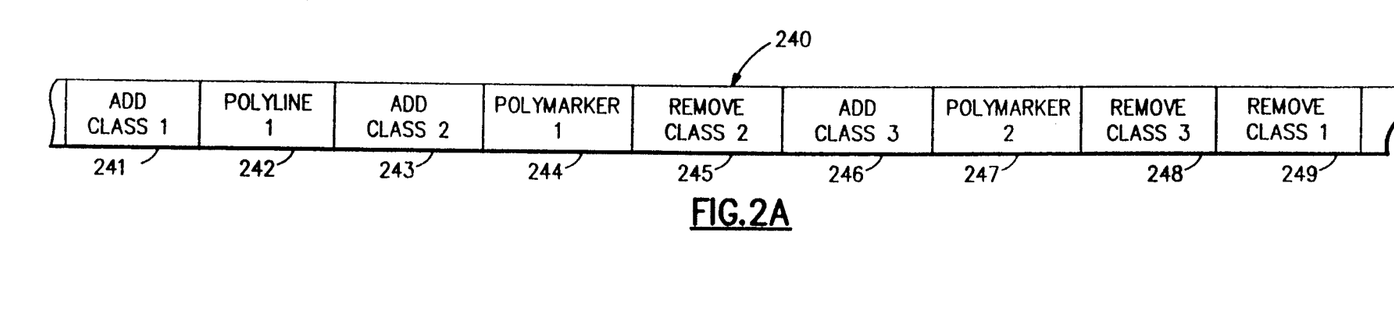
FIG. 2A is a schematic block diagram of a structure containing class name orders.

In the graphics subsystem 102, rendering is influenced by a set of class names which varies dynamically as the structure hierarchy 200 is traversed. Each class name may be configured (by setting the appropriate class name bits as described below) to include or exclude one or more of the PHIGS attributes of highlighting, detectability, and visibility. The class names are used to control the highlighting, detectability, and visibility of the primitives, by logically combining the including and excluding actions of each of the individual class names in a manner to be described below. Thus, referring to FIG. 2A, a structure 240 may include the following structure elements:

241: Add class 1 to set;
242: Polyline 1;
243: Add class 2 to set;
244: Polymarker 1;
245: Remove class 2 from set;
246: Add class 3 to set;
247: Polymarker 2;
248: Remove class 3 from set; and
249: Remove class 1 from set.

The membership of the set of class names varies dynamically during the traversal of structure 240, as follows:

| Structure Element | Class Name Set |
| --- | --- |
| 241 | 1 |
| 242 | 1 |
| 243 | 1, 2 |
| 244 | 1, 2 |
| 245 | 1 |
| 246 | 1, 3 |
| 247 | 1, 3 |
| 248 | 1 |
| 249 | Empty |

Structure hierarchies are described in further detail in the Hempel et al. patent identified above, as well as in the commonly assigned copending applications of T. J. Ebbers et al., Ser. No. 07/425,781, filed Oct. 23, 1989, entitled "Picking Function for a Graphics System Using Hierarchical Graphics Structures", and of T. J. Ebbers, Ser. No. 07/425,764, filed Oct. 23, 1989, entitled "Memory Manager for Hierarchical Graphic Structures", which patent and applications are incorporated herein by reference.

Traversal types as they relate to the present invention may be briefly defined. Draw traversals are performed to generate pixel data for writing to the frame buffer 136 for display. Pick traversals, on the other hand, are performed to identify those primitives which, if rendered, would intercept a predefined pick aperture that is typically indicated on the display by a cursor and is positioned on the screen by manipulating a pointing device such as a mouse (not shown).

Figure 8:
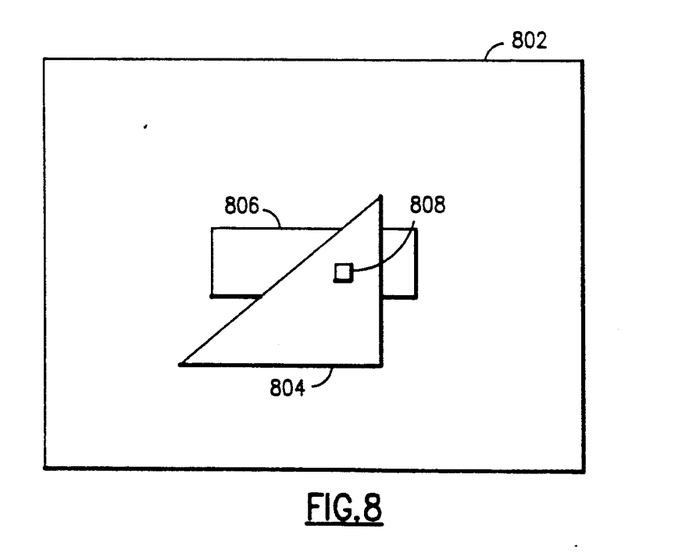
FIG. 8 is a view of a display screen containing primitives that overlap within a pick window.

Standard pick traversals identify those primitives which geometrically intercept the pick aperture, even though the primitive may not be visible in the pick aperture because it is covered by another primitive. Visible pick traversals, on the other hand, identify only those primitives that are visible within the pick aperture. FIG. 8 illustrates the difference these two pick traversal types. Shown in the figure is a display 802 on which a first primitive 804 overlies a second primitive 806, hiding the second primitive in the region of the pick aperture 808. A standard pick traversal would identify either of primitives 804 and 806, assuming it was detectable, since either primitive if drawn alone would intercept the pick aperture 808. A visible pick traversal, however, would identify primitive 804 but not primitive 806, since primitive 804 is the only primitive visible in the pick aperture 808. Visible pick traversals are described further in the copending application of J. J. Lawless et al., Ser. No. 07/701,255, filed May 16, 1991, entitled "Visible Picking in a Graphics System", incorporated herein by reference.

Figure 3:
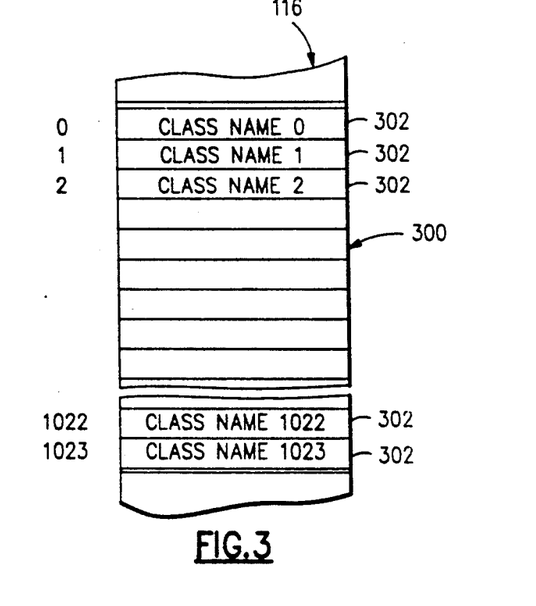
FIG. 3 is a schematic block diagram of the portion of the local memory shown in FIG. 1 that is used to store class name information.
Figure 4:
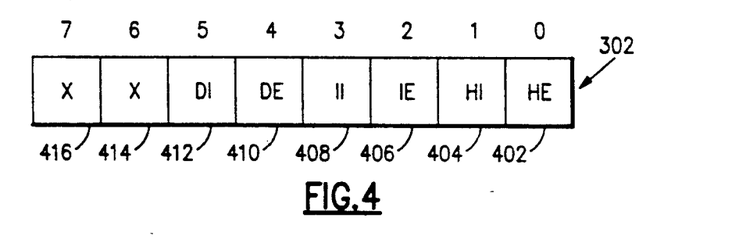
FIG. 4 shows the format in which the class name information is stored in the local memory portion shown in FIG. 3.

Class name information is stored in an area 300 (FIG. 3) of local memory 116. In the embodiment shown, a memory location 302 of one byte (8 bits) is provided for each of up to 1024 class names. Each location 302 stores filter information for a particular class name in the format shown in FIG. 4 so as to include:

a highlight exclusion (HE) bit 402;
a highlight inclusion (HI) bit 404;
an invisibility exclusion (IE) bit 406;
an invisibility inclusion (II) bit 408;
a detectability exclusion (DE) bit 410; and
a detectability inclusion (DI) bit 412.

The leftmost two bits 414 and 416 (marked "x" in FIG. 4) are unused in the present embodiment.

As a particular structure hierarchy 200 is traversed, class names are added to or removed from the set. A primitive encountered in the course of a traversal is considered to belong to those classes currently in the set. The inclusion and exclusion bits 402-412 defined for each class name in the set determine the highlighting, invisibility, and pickability of the primitive. A primitive is considered to be highlighted, for instance, if (1) at least one class name in the current set has the highlight inclusion bit 404 set to 1 and (2) no class name in the current set has the highlight exclusion bit 402 set to one. Similar tests using bits 406-412 are used to determine whether a primitive is invisible or detectable.

Figure 5:
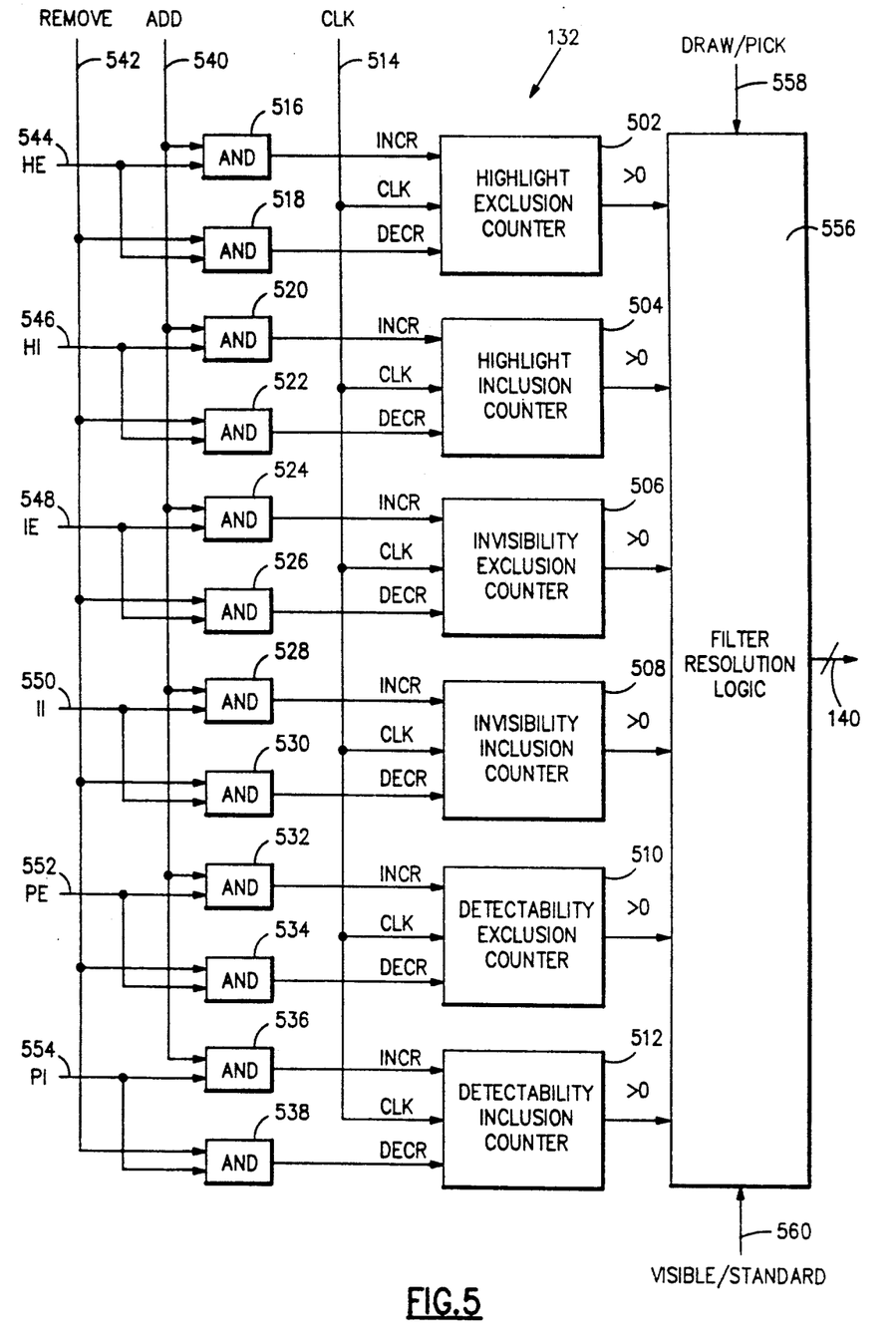
FIG. 5 is a schematic block diagram of the filter counters and associated indexing logic of the VAAM control module shown in FIG. 1.

Referring to FIG. 5, VRAM control module 132 contains six internal counters for keeping track of the various inclusion and exclusion attributes for the current set of class names. These counters include highlight exclusion counter 502, highlight inclusion counter 504, invisibility exclusion counter 506, invisibility inclusion counter 508, detectability exclusion counter 510, and detectability inclusion counter 512. Each of counters 502-512 may be reset to zero by suitable means not shown and is incremented or decremented in response to the coincidence of a clock (CLK) input from line 514 and an increment (INCR) or decrement (DECR) input from an AND gate.

Thus, highlight exclusion counter 502 receives its increment input from an AND gate 516 and its decrement input from an AND gate 518. AND gates 516 and 518 each receive one input from a highlight exclusion (HE) line 544, which is provided with the appropriate HE bit 402 from the corresponding class name location 302 in local memory 116 when the counters 502-512 are updated for a particular class name. AND gate 516 receives its other input from an ADD line 540, which is actuated when a class name is to be added to the set, while AND gate 518 receives its other input from a REMOVE line 542, which is actuated when a class name is to be removed from the set.

In a similar manner, highlight inclusion counter 504 receives its increment input from an AND gate 520 and its decrement input from an AND gate 522. AND gates 520 and 522 each receive one input from a highlight inclusion (HI) line 546, which is provided with the appropriate HI bit 404 from the corresponding class name location 302 in local memory 116 when the counters 502-512 are updated for a particular class name. AND gates 520 and 522 receive their other inputs from ADD line 540 and REMOVE line 542, respectively.

Likewise, invisibility exclusion counter 506 receives its increment input from an AND gate 524 and its decrement input from an AND gate 526. AND gates 524 and 526 each receive one input from an invisibility exclusion (IE) line 548, which is provided with the appropriate IE bit 406 from the corresponding class name location 302 in local memory 116 when the counters 502-512 are updated for a particular class name. AND gates 524 and 526 receive their other inputs from ADD line 540 and REMOVE line 542, respectively.

Similarly, invisibility inclusion counter 508 receives its increment input from an AND gate 528 and its decrement input from an AND gate 530. AND gates 528 and 530 each receive one input from a invisibility inclusion (II) line 550, which is provided with the appropriate II bit 408 from the corresponding class name location 302 in local memory 116 when the counters 502-512 are updated for a particular class name. AND gates 528 and 530 receive their other inputs from ADD line 540 and REMOVE line 542, respectively.

Detectability exclusion counter 510 receives its increment input from an AND gate 532 and its decrement input from an AND gate 534. AND gates 532 and 534 each receive one input from a detectability exclusion (DE) line 552, which is provided with the appropriate DE bit 410 from the corresponding class name location 302 in local memory 116 when the counters 502-512 are updated for a particular class name. AND gates 532 and 534 receive their other inputs from ADD line 540 and REMOVE line 542, respectively.

Finally, detectability inclusion counter 512 receives its increment input from an AND gate 536 and its decrement input from an AND gate 538. AND gates 536 and 538 each receive one input from a detectability inclusion (DI) line 554, which is provided with the appropriate DI bit 412 from the corresponding class name location 302 in local memory 116 when the counters 502-512 are updated for a particular class name. AND gates 536 and 538 receive their other inputs from ADD line 540 and REMOVE line 542, respectively.

As described below, VRAM control module 132 actuates line 540 after receiving an Add Class Name order to increment the appropriate counters 502-512, as indicated by class name bits 544-554, if the class name is not already a member of the current set. Similarly, VRAM control module 132 actuates line 542 after receiving a Remove Class Name order to decrement the appropriate counters 502-512, as indicated by class name bits 544-554, if the class name is a member of the current set. The class name bits 544-554 are read from local memory 116 by control processor 112 and supplied to VRAM control module 132 in parallel on line 142.

Each of counters 502-512 provides an output indicating whether the output of that counter is greater than zero. These outputs are supplied to filter resolution logic 556, combinatorial logic within VRAM control module 132, which generates outputs on line 140 to mapping RAM 114 (and thence to control processor 112) indicating the resolution of the counters in terms of highlighting, invisibility, and detectability.

In accordance with the present invention, the inclusion and exclusion signals on lines 544-554 are provided in parallel, concurrently with a clock (CLK) signal on line 514 and an ADD or REMOVE signal on line 540 or 542, to permit simultaneous updating of each of the counters 502-512 for a class name. This is in contrast to the prior art, in which registers or other locations storing the equivalent counts are updated successively, in different memory cycles. This substantially enhances overall system performance, because a significant portion of the total processing time can be devoted merely to updating inclusion and exclusion counters as class names are added to or removed from the current set.

Figure 6:
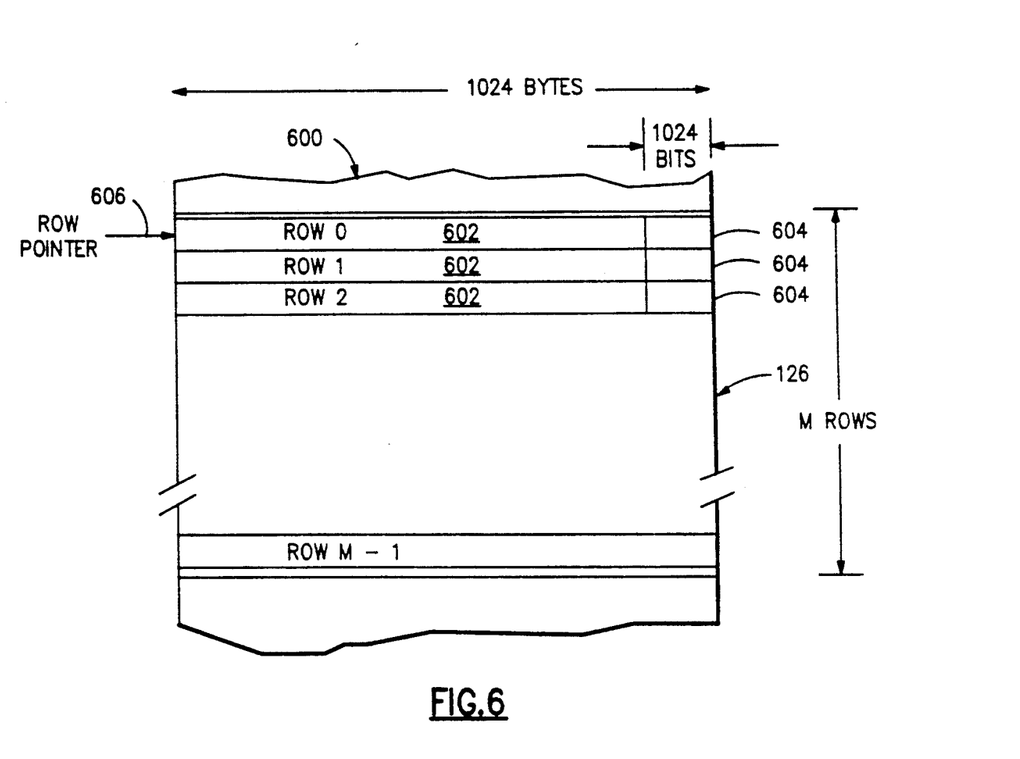
FIG. 6 is a schematic block diagram of the VRAM attribute stack shown in FIG. 1.

In the preferred embodiment, a total of 1024 bits are used to indicate the current composition of the class name set, each bit serving as a flag indicating whether the corresponding class name is part of the set. These bits are stored, along with other structure state information, in the attribute stack 126 (FIG. 1). Preferably, attribute stack 126 is contained in a video RAM (VRAM) 600 (FIG. 6). VRAM 600 may be considered to be organized into 256 columns 602, each of which contains storage for 1024 bytes. This organization may be realized in various ways. In the disclosed embodiment, VRAM 600 may comprise eight modules (not separately shown), each module containing 256 addressable rows and columns and being 4 bits deep. However, the particular physical realization of VRAM 600 is not important as such to the present invention.

Figure 7:
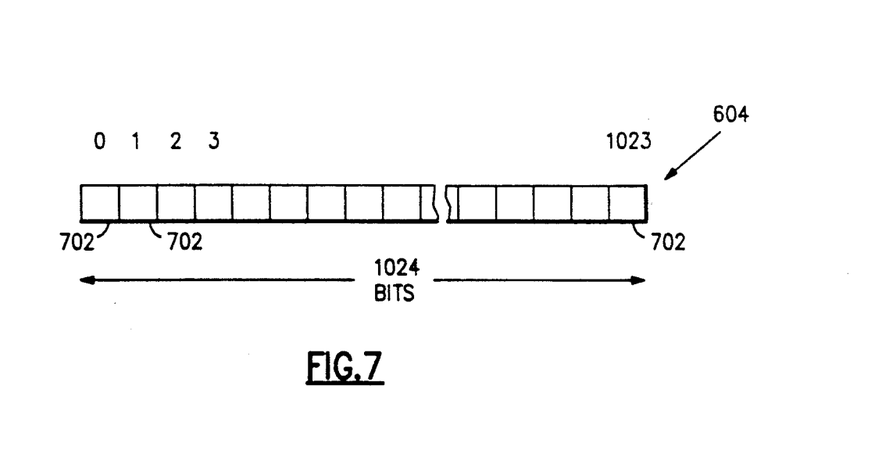
FIG. 7 is a schematic block diagram of the flags indicating which class names are part of the current set.

A portion 604 of each row 602 containing 1024 bits is used to store that part of the structure state information representing the current composition of the class name set. Although portion 604 is shown in FIG. 6 as being the final portion of row 602, the particular location of class name portion 604 within row 602 is not important to the present invention. Referring to FIG. 7, class name portion 604 contains 1024 bits 702, each of which corresponds to a particular class name and is set to a particular logic level (e.g., 1) if the class name is included in the current set.

Each row 602 of the attribute stack 126 is used to store structure state information for a particular structure level of the structure hierarchy 200 (FIG. 2). A row pointer 606 which is initialized to the first row 602 in the attribute stack 126 points to the current row. As the traversal proceeds to lower-level structures in response to execute-structure commands, the row pointer 606 is incremented and additional rows 602 of VRAM 600 are used to store structure state information, each row 602 storing information for a particular level of structure. As the traversal returns to higher-level structures, the row pointer 606 is correspondingly decremented.

The operation of the filter process is as follows. Control processor 112 first creates a list of class names in area 300 of local memory 116. Each class name location 302 in local memory 116 contains a string of bits 402-412 (FIG. 4) which specify how the class name affects the various filter inclusion and exclusion counters 502-512 (FIG. 5). Control processor 112 clears a row 602 of the filter VRAM 600 (FIG. 6), while the VCM 132 clears the six counters 502-512 (FIG. 5) to zero.

During a PHIGS structure traversal, two types of filter updates can occur: Add Class Name to Set, and Remove Class Name from Set. Add Class Name to Set causes the class name specified in the order to be added to the set of included class names unless it is already included. Upon receiving the Add Class Name order, the filter logic 132 performs a read-modify-write (RMW) operation on the VRAM 126 to determine whether the selected class name has already been included. In particular, the filter logic examines the corresponding class name bit in the portion 604 of the current row 602 as indicated by the row pointer 606.

If the corresponding class name bit in row portion 604 is already set to 1, indicating that the class name is already a member of the set, no further action is taken. Otherwise, the corresponding class name bit 702 in area 604 is set to add the class name to the set. If the class name is added, then the corresponding filter counters 502-512 are incremented. This is accomplished for all six counters 502-512 concurrently by gating the ADD signal on line 540, and thus the counter incrementing, with the 6-bit class name string on lines 544-554, as described above. This bit string is provided to the VRAM control module 132 by the control processor 112, which reads it from local memory 116. (Although it is part of local memory 116 in the present embodiment, the class name memory 302 may be placed in the VRAM control module 132 itself if desired.)

Remove Class Name from Set works in an analogous fashion. If the class name has not been previously added to the set (i.e., the corresponding class name bit 702 in row area 604 has not been set), then the request is ignored and treated as a no-op; a class name can only be removed if it has been previously added. Upon removal, the bit 702 is cleared, and the appropriate filter counters 502-512 are decremented in a manner analogous to that described above, using the REMOVE signal on line 542.

After each Add or Remove Class Name order, the filter resolution logic 556 resolves the state of the filter counters 502-512. A primitive is considered detectable, highlighted, or invisible if it is included and not excluded, that is, if the corresponding inclusion filter counter 504, 508, or 512 is greater than zero and the corresponding exclusion filter 502, 506 or 510 counter is zero. These composite filter results are made available to the rest of the system via lines 140 (FIG. 1).

When an execute-structure command is encountered during a traversal (FIG. 2), the current row 602 of the attribute stack 126 is copied down one row and the current row pointer 606 is incremented. Upon returning from a structure, the row pointer 606 is decremented. Thus, the VRAM 126 behaves as a bit string stack for the class names.

Also, during execute-structure, the six filter counters 502-512 are read and their values are saved in the video RAM stack 126 so they can be restored upon return from structure.

Filter resolution logic 556 provides outputs for invisibility, highlighting and detectability on lines 140. The filter resolution logic output for highlighting is dependent on the outputs of highlight exclusion and inclusion counters 502 and 504, as described above. Similarly, the filter resolution logic output for detectability is dependent on the outputs of detectability exclusion and inclusion counters 510 and 512.

The filter resolution logic output for invisibility is responsive to the invisibility exclusion and inclusion filter counters 506 and 508 as well as two additional externally provided inputs: the current type of traversal (draw or pick correlation) (line 558) and, if a pick traversal, the type of pick (visible or standard), as described above (line 560). These additional inputs improve the overall system performance. During a standard pick traversal, if the filter counters 510 and 512 resolve to nondetectable, then a primitive is treated as being invisible. Invisible primitives are not rendered or pick-correlated against—thus reducing the amount of total processing.

This processing short-cut cannot be taken while processing a visible-pick traversal, because non-detectable primitives can potentially contribute to the ultimate visibility of detectable primitives. Thus, referring to FIG. 8, even if primitive 804 is nondetectable, it still affects the visibility of primitive 806, since it hides primitive 806 in the region of the pick aperture 808. Thus, if line 558 indicates a pick traversal and line 560 indicates a visible pick transversal, the filter resolution logic output for visibility depends only on the outputs of visibility counters 506 and 508 and not on detectability counters 510 and 512.

Each time an execute-structure command (FIG. 2) is encountered, the contents of the filter counters 502-512 are saved on stack 126 in the same fashion as the class name inclusion bit string. A return from structure causes the filter counts to be popped from the stack. As packaging becomes denser, it will become possible to have RAM internal to the VRAM control module 132 to save the six counters during execute-structure. Thus the hardware provides a complete solution to the filter processing task.

The design of the VRAM control module 132 is such that the maximum hierarchy depth depends on the number of rows in VRAM 600 that can be addressed by the module (via the row pointer 606). Additional depth requires either additional VRAM rows or wider registers within the module to address the existing rows, but no other design changes. Also, the number of class names supported is limited only by the width of the VRAM row and can easily be increased by ganging multiple VRAMs together in parallel. No design changes are necessary.

What is claimed is:

1. In a graphics system in which primitives represented by graphics orders and having a set of class names associated therewith are displayed in accordance with one or more display attributes associated with said class names, said system containing means for storing a flag for each of the class names, apparatus for controlling said display attributes comprising:

a plurality of counters, at least one of said counters being associated with each of said attributes;

means for storing a bit string for each of said class names, each bit of said string being associated with one of said counters;

means responsive to a graphics order affecting an inclusion of a class name in said set for generating an indexing signal for said counters;

means responsive to said graphics order affecting the inclusion of a class name in said set for generating in parallel the bit string corresponding to said class name;

means for gating said indexing signal in parallel with said bit string to generate respective gated indexing signals for said counters.

2. A method for displaying graphics primitives represented by graphics orders and for controlling display attributes of said graphics primitives, processed in a graphics processor, comprising the steps of:

associating, in a computer processor, a set of class names with said graphics primitives, one or more display attributes being associated with said class names;

storing in a storage means a flag for each of said class names;

associating at least one counter with each of said display attributes;

storing in a storage means a bit string for each of said class names, each bit of said string being associated with one of said counters;

determining whether a flag corresponding to a class name contained in an order for addition of said class name to a set of class names has been set and, if said flag has not been set, setting said flag and incrementing corresponding counters in parallel controlled by a bit string associated with said class name;

determining whether a flag corresponding to a class name has been reset in response to an order for removal of said class name from said set and, if said flag has not been reset, resetting said flag and decrementing corresponding counters in parallel controlled by said bit string associated with said class name;

controlling said display attributes in accordance with a state of said counters;

generating in a graphics processor data representing display attributes for each addressable location on a display device;

displaying the results of said processing on said display device.

3. A method as in claim 2 in which each of said attributes has an inclusion counter and an exclusion counter associated therewith, each attribute being controlled in a predetermined manner in response to a zero output from the corresponding exclusion counter and a non-zero output from the corresponding inclusion counter.

4. A method according to claim 2 further comprising a step of:

generating an indexing signal for said counters in response to a graphics order affecting inclusion of a class name in said set.

5. A method according to claim 4 further comprising generating in parallel a bit string corresponding to said class name in response to a graphics order affecting the inclusion of said class name in said set.

6. A method according to claim 5 further comprising the step of:

gating said indexing signal in parallel with said bit string to generate respective gating indexing signals for said counters.

* * * * *